United States Patent
Rapp (12)

(10) Patent No.: US 6,583,923 B1
(45) Date of Patent: Jun. 24, 2003

(54) OPTICAL FIBER AMPLIFIER

(75) Inventor: Lutz Rapp, Deisenhofen (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/732,167

(22) Filed: Dec. 7, 2000

(30) Foreign Application Priority Data

Dec. 7, 1999 (DE) .......................... 199 58 894
Nov. 23, 2000 (DE) .......................... 100 58 059

(51) Int. Cl.$^7$ .............................................. H04B 10/12
(52) U.S. Cl. ................................ 359/337.2; 359/337.1; 359/337
(58) Field of Search ..................... 359/341.41, 341.42, 359/337.1, 341.4

(56) References Cited

U.S. PATENT DOCUMENTS

| | | | | |
|---|---|---|---|---|
| 5,115,338 A | * | 5/1992 | DiGiovanni et al. | ......... 359/337 |
| 5,245,690 A | * | 9/1993 | Aida et al. | ............. 359/337.11 |
| 5,392,154 A | * | 2/1995 | Chang et al. | ................ 359/124 |
| 6,055,094 A | * | 4/2000 | Shima et al. | ................ 359/124 |
| 6,115,174 A | * | 9/2000 | Grubb et al. | ................ 359/334 |
| 6,173,094 B1 | * | 1/2001 | Bowerman et al. | ......... 359/161 |
| 6,323,994 B1 | * | 11/2001 | Li et al. | ..................... 359/124 |
| 6,424,457 B1 | * | 7/2002 | Koonmen et al. | ....... 359/337.1 |

FOREIGN PATENT DOCUMENTS

WO    WO 98/36513    8/1998

OTHER PUBLICATIONS

Becker et al. "Erbium–Doped Fiber Amplifiers: Fundamentals and Technology." Academic Press, Mar. 1999, pp. 268–276, 261–294.*

Laming et al. "Erbium–Doped Fiber Amplifier with 54 dB Gain and 3.1 dB Noise Figure." IEEE Photonics Tech. Lett. 4:12, Dec. 1992, pp. 1345–1347.*

Lumholt et al. "Optimum Position of Isolators within Erbium–Doped Fibers." IEEE Photonics Tech. Lett. 4:6, Jun. 1992, pp. 568–570.*

* cited by examiner

*Primary Examiner*—Thomas G. Black
*Assistant Examiner*—Andrew R. Sommer
(74) *Attorney, Agent, or Firm*—Bell, Boyd & Lloyd, LLC

(57) ABSTRACT

The invention is directed to an optical fiber amplifier having a switchable or interchangeable fiber module for varying the effective length of an amplification fiber. An optical fiber amplifier for wavelength-division multiplex (WDM) signals comprises an interchangeable fiber module (FM) in the basic amplifier module (VM) for matching the gain to different input levels for optimum noise behavior. The change in amplification is based on the variation of the length of the amplification fibers (EDF1, EDF2).

13 Claims, 8 Drawing Sheets

OPTICAL FIBER AMPLIFIER

BACKGROUND OF THE INVENTION

1. Field of the Invention

The invention is directed to an optical fiber amplifier having a switchable or interchangeable fiber module for varying the effective length of an amplification fiber.

2. Description of the Related Art

Optical wavelength-division multiplex (WDM) transmission systems must be designed such that they can be operated on links having different amplifier spacings (physical). The problem that arises is illustrated as follows. Line attenuations between 33 dB and 14 dB are provided between the individual, multi-stage amplifiers. This results in the input powers per channel at the amplifier input lying between approximately −28 dBm and −13 dBm. The following presumes that the optical amplifier (inline amplifier) can be divided into a pre-amplifier followed by an attenuation element and a booster (power amplifier). Fixed levels (for example, 0 dBm/channel) at a photodiode are required for optimum detection, so that the power per channel at the output of the amplifier and, thus, at the input of the booster must be constant, i.e., independent of the gain in the individual amplifier sections.

In the above applied example, the gain of the amplifier, which is defined by the length of the doped fiber as well as by the average occupancy inversion in addition to being defined by the fiber parameters, must be capable of being varied between 13 dB and 28 dB. The variation of the amplifier gain is particularly easy via the pump power. When the pump power is reduced, the average occupancy inversion (and, thus, the gain as well) decrease. This, however, is unsuitable for WDM systems since the curve of the gain over the wavelength is highly dependent on the average occupancy inversion $\overline{N}_2$. The average occupancy inversion $\overline{N}_2$ is defined as the normed average of the occupancy inversions $N_{2i}$ (for all ions with meta-stable levels) of all amplifier stages $V_i$ (for example, 0<i<3 for a pre-amplifier and a booster) over the entire length of the optical amplifier. The $N_{2i}$ can be functions of the location. Amplifiers for WDM systems must exhibit a flat gain curve that can be additionally realized with the assistance of specific filters in a defined an operating condition. When the average occupancy inversion is modified, then the individual wavelength channels experience a clearly different gain.

A flat gain curve can even be achieved without specific filters in the L-band (approximately 1570–1610 nm), in that an average occupancy inversion of approximately 35% (or approximately $\overline{N}_2$=0.35) is set. This percentage is dependent on the erbium-doped fibers employed. Thus, for a gain of 30 dB, the gain differences amount to, e.g., only 1.8 dB. Noticeably greater gain differences occur, however, as soon as the average occupancy inversion changes. A pre-amplifier for WDM systems is therefore usually dimensioned such that it comprises a maximum required, constant gain. By inserting an additional attenuation, the gain can then be reduced to the value needed in a specific application. However, high noise coefficients arise given high attenuations for low gains.

The International Patent document PCT/WO98/36513, "Optical Fiber Amplifier Having Variable Gain", discloses an optical fiber amplifier with a gain control for WDM signal transmission. The circuit is explained in FIG. 2 of this document, in which a controlled attenuation element 5 is inserted between the two amplifier stages 3 and 11. Three photoelectric elements 13, 17 and 25 measure the light power along the amplifier, and regulate the attenuation via a controller. The goal of this regulation is to obtain a variable output gain of the amplifier given a constant curve of all output channel levels of a WDM input signal. Expediently, the "tilt" of the gain following the first pre-amplifier stage is compensated by a spectral gain smoothing filter 9. A spectrally uniform gain can thus be achieved at the output of the amplifier for all WDM channels. An attempt is made in the general case to keep the gain and, thus, the noise of the first pre-amplifier stage low. The attenuation is boosted for high input levels. However, this still produces high noise coefficients.

The following paragraphs discuss a few versions optical amplification according to the Prior Art, illustrated in FIGS. 1–4. Their properties are explained and the disadvantages that are eliminated by the present invention are described.

Figure 1:
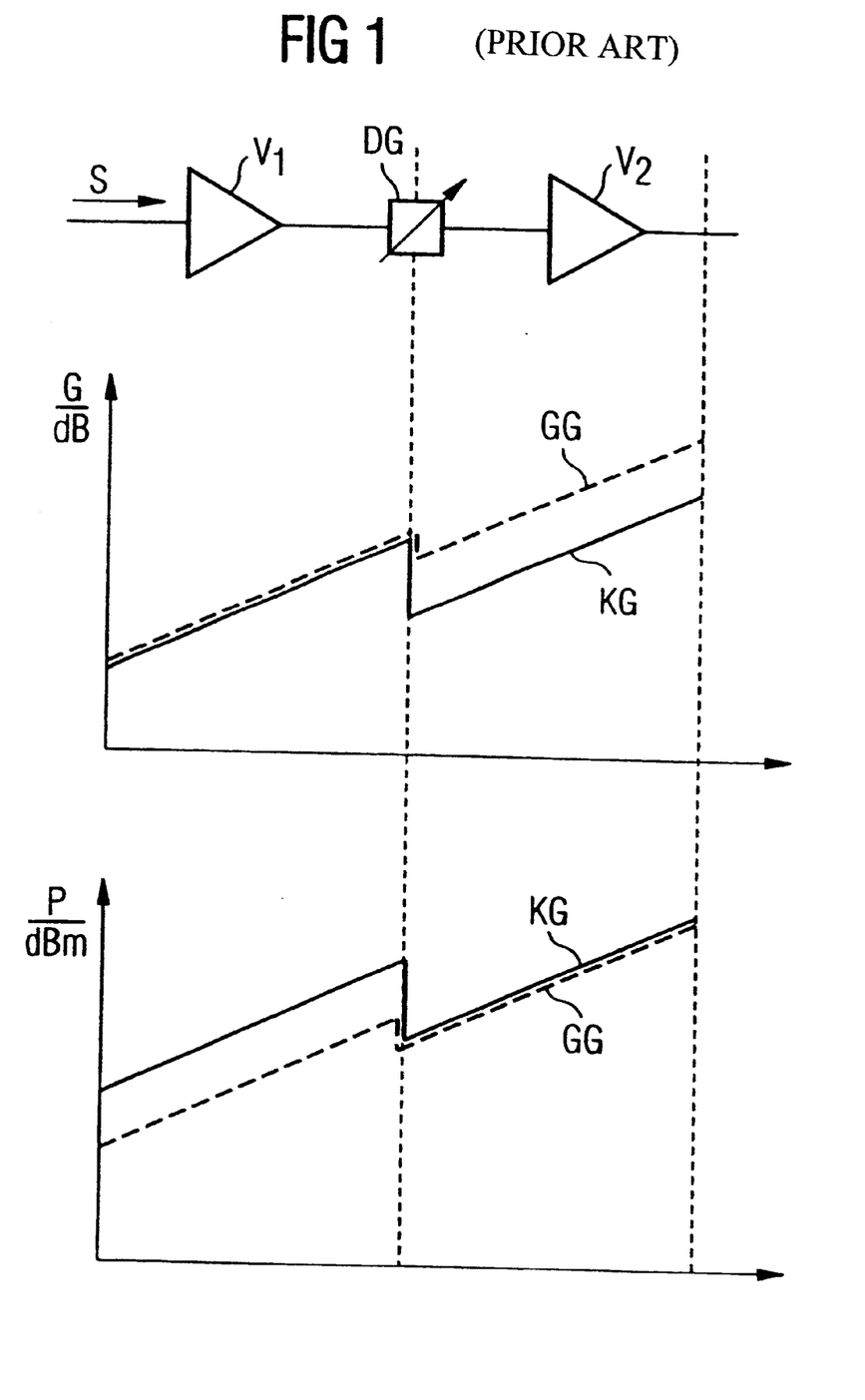
FIG. 1 is a schematic diagram and associated gain and power graph illustrating the basic principle according to the prior art of setting the gain with a variable attenuation element.

As shown in FIG. 1, the amplifier is divided into two stages V1 and V2 between which a variable attenuation element DG is inserted. FIG. 1 also shows the gain G and the signal power P (or level) along the fiber amplifiers for two different amplifications.

For low input levels of the WDM signal S, an amplification ensues with a high gain GG. The broken line refers to the high gain GG of a signal with low input power.

For high input levels, a low gain KG given a poor noise coefficient is achieved due to the high attenuation between the amplifier stages. The solid line refers to the low gain KG of a signal with high input power. The high levels are highly attenuated by the attenuation element DG between the two amplifier stages V1 and V2.

Figure 2:
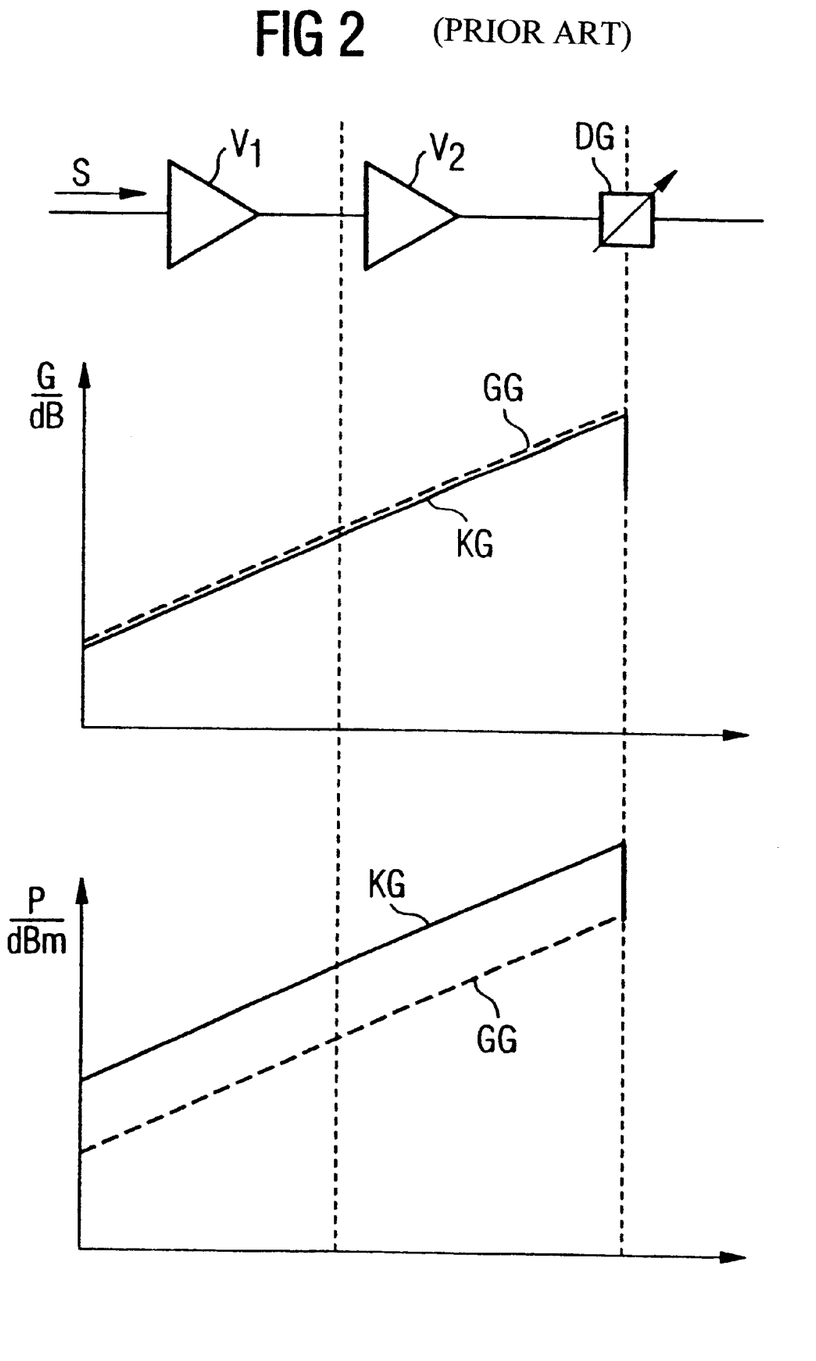
FIG. 2 is a schematic diagram and associated gain and power graph illustrating modifications of the basic principle according to the prior art for setting the gain with a variable attenuation element.

The amplifier in FIG. 2 comprises the same components V1, V2 and DG as in FIG. 1, but the attenuation element DG is attached directly to the output of the second amplifier stage V2. This version enables a variable amplification with good noise coefficients for low and high gains G. The levels in the amplifier, however, will reach high values for signals with a high input power, resulting in non-linearities occurring particularly in the L-band for high levels in the amplifier stage V2. However, the average occupancy inversion $\overline{N}_2$ must be maintained given increased input power, requiring clearly higher pump powers. It can be clearly seen in FIG. 2 that signals having high input power are amplified unnecessarily with high pump power and are in turn attenuated at the output. This version, however, solves the previously identified noise coefficient problems of the amplifier according to FIG. 1.

Figure 3:
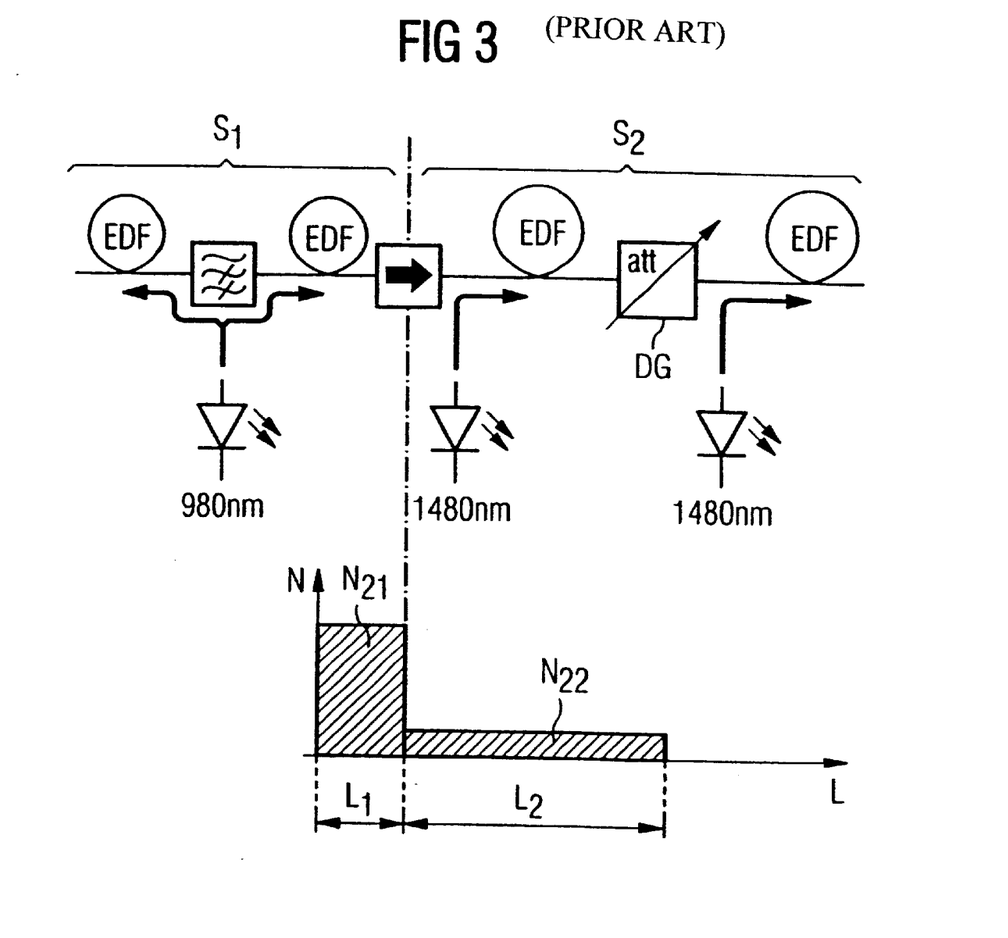
FIG. 3 is schematic diagram of an L-band EDFA with an associated occupancy inversion graph according to the prior art.

FIG. 3 shows the typical structure of an L-band amplifier. The occupancy inversion is schematically shown as function of the fiber length L. It is critical that the occupancy inversion $N_{21}$ in the first section $S_1$ of the erbium-doped fibers EDF is very high in order to keep the noise coefficient low. The desired, average occupancy inversion $\overline{N}_2$ is then set with the following sections of lower occupancy inversion. The average occupancy inversion $\overline{N}_2$ is calculated as $$\overline{N}_2 = \frac{1}{L_G} \sum_i \int_{L_i} N_{2i}(l)\,dl,$$

where $L_G$ references the overall length of the erbium-doped fibers in the i various amplifier stages. $N_{2i}$ references the occupancy inversion of the $i^{th}$ amplifier stage with fiber length $L_i$. Only two amplifier stages with corresponding occupancy inversions $N_{21}$, and $N_{22}$ are shown in this example. The occupancy inversions $N_{22}$ should be as small as possible, so that the first fiber section becomes optimally long with a given, average occupancy inversion.

Figure 4:
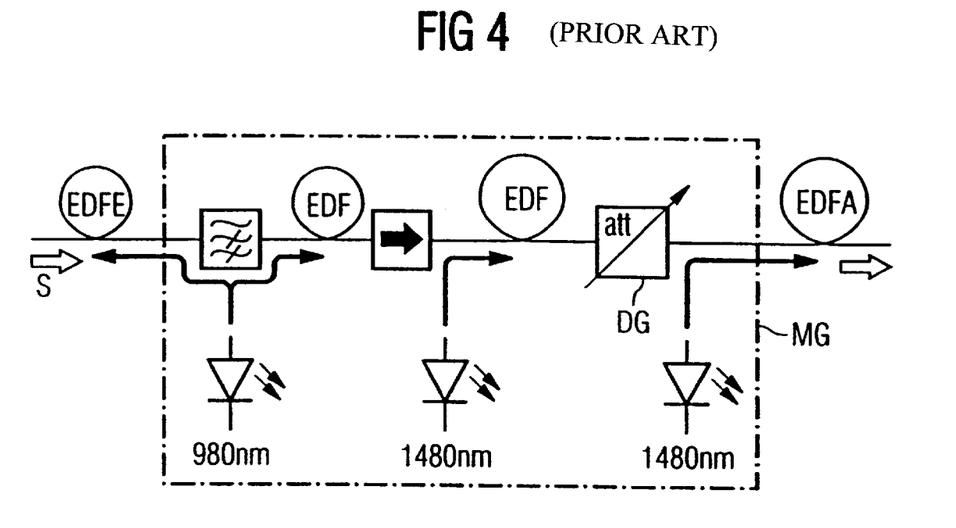
FIG. 4 is a schematic diagram illustrating an amplifier module according to the prior art.

FIG. 4 shows a fiber amplifier that is adaptable to different input levels. A respective, doped fiber section EDFE and EDFA outside a module housing MG is located at the input and output. The gain is then varied in that these fiber sections are replaced by correspondingly shorter or longer ones. For a change of the lengths of the two fiber sections by $\Delta L_1$ and $\Delta L_2$, where $N_{21}$, and $N_{22}$ are kept constant and $\Delta L_1 \times L_2 = \Delta L_2 \times L_1$ is also valid, the average occupancy inversion $\overline{N}_2$ does not change and the relative gain differences continue to be slight. The outlay given this version is too great since an extensive set of fibers is needed for all required gain values.

Therefore, only a supply of a few fibers and, further, an attenuation element DG are provided. The configuration that minimally exceeds the desired gain is sought from the supply of fibers. The fine adjustment then occurs with the attenuation element DG. Since the insertion attenuations are now clearly lower, the auxiliary attenuation has less of an influence on the noise coefficient. One advantage of this arrangement is that the occupancy inversions $N_{21}$, and $N_{22}$ need not be adapted. It is disadvantageous that two fiber sections must be replaced.

SUMMARY OF THE INVENTION

The object of the present invention is to provide a simple mechanism for adapting the fiber amplifier in WDM systems to different input levels or gain values for optimum noise behavior.

This object is inventively achieved by an optical fiber amplifier comprising a switchable or interchangeable fiber module for varying an effective length of an amplification fiber. The fiber module may further comprises a connecting fiber, an amplification fiber, and/or an attenuation element. The fiber module may comprise an amplification fiber divided into two amplification fiber sections with an intervening attenuation element. The optical fiber amplifier may also comprise a first amplifier stage; and a last amplifier stage, the fiber module being arranged between said first amplifier stage and said last amplifier stage. The fiber module may further comprise an attenuation element, and a maximally set attenuation of said attenuation element is less than the difference between a maximum and a minimum amplifier gain. The optical fiber amplifier may further comprise filters in an amplifier module or in said fiber module for leveling the spectrum of signal levels. The fiber module may further comprise a dispersion-compensating fiber, potentially with a pump source, and/or a separate gain control for the dispersion-compensating fiber.

The inventive amplifier allows an expansion of the range of amplification without having to highly attenuate the signal following the pre-amplification. This results in the noise coefficients remaining small at the different amplification values, particularly given low amplifications as well.

The gain in the inventive amplifier is directly set by different fiber lengths of a module. Only one interchangeable or switchable, passive fiber module is provided. The great advantage of the illustrated solution is that the auxiliary module FM is purely passive and, thus, no further terminals other than the optical input and output are required.

Only one auxiliary module is usually required for setting two different amplification values; the fine adjustment of the amplification value is realized with an attenuation element having a low attenuation value.

Given a correct setting of the pump powers, the average occupancy inversion $\overline{N}_2$ is kept such given variation of the fiber length that the amplifier exhibits a flat gain spectrum for the amplification of all WDM channels.

In the inventive amplifier, the remaining amplification differences can be minimized by a specific, additional filter suitable for different gains.

The use of a plurality of fiber modules that are optimized for achieving different amplifications is also possible. One auxiliary module can basically be utilized in each amplifier stage. A plurality of modules can also be utilized in different amplifier stages. The best configuration is selected on the basis of the specific demands.

The switching between these fiber modules can be done with plug-type connectors or with switches. In practice, however, the use of a fiber amplifier without or with an additionally inserted fiber module suffices for achieving the required amplification values from 20 db through 30 dB.

BRIEF DESCRIPTION OF THE DRAWINGS

An exemplary embodiment of the invention is described in greater detail on the basis of FIGS.

DESCRIPTION OF THE PREFERRED EMBODIMENTS

Figure 5:
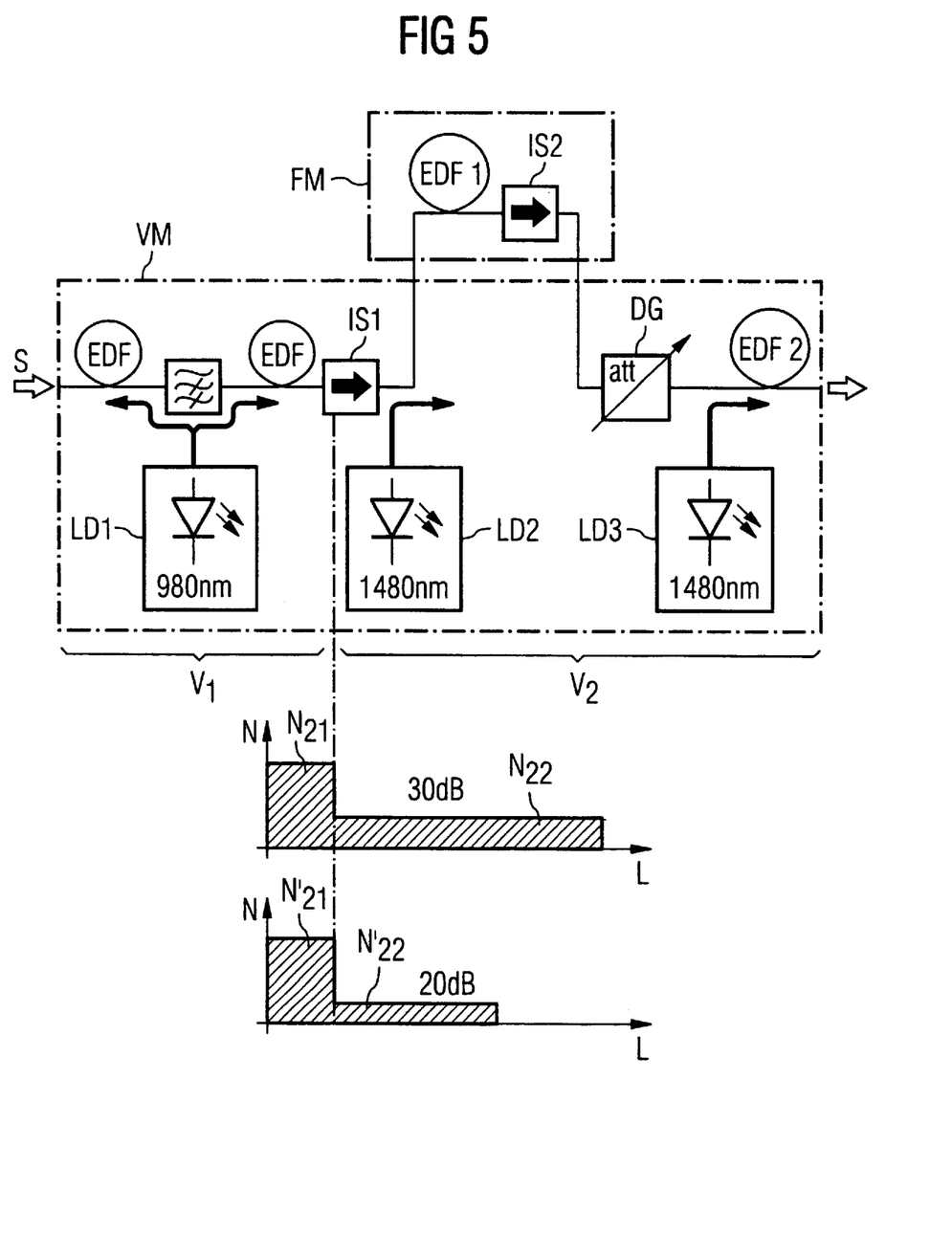
FIG. 5 is a schematic diagram amplifier configuration with only one replaceable fiber module and an associated occupancy inversion graph.

FIG. 5 shows an inventive fiber amplifier in which only the length of a single fiber is varied.

The inventive fiber amplifier, whose occupancy inversion N is schematically shown as function of the fiber length L, contains a first amplifier unit V1 at which a pump signal from a 980 nm laser diode LD1 is centrally supplied in a fiber section EDF co-directionally and contra-directionally relative to the transmission signal. The amplifier stage V1 comprises a range of high occupancy inversion $N_{21}$, or, respectively, $N'_{21}$. An isolator IS1 arranged at the output of the first amplifier stage is followed by a second amplifier stage V2 with two 1480 nm pump laser diodes LD2 and LD3 whose pump signals are co-directionally supplied into two following fiber sections EDF1 and EDF2. An isolator IS2 and an attenuation element DG are inserted between the fiber sections EDF1 and EDF2. The first fiber section EDF1 and the isolator IS2 are inserted in what is referred to as a fiber module (auxiliary module) FM separated from the basic amplifier module VM. When the auxiliary module FM is replaced by a connecting cable, the basic amplifier module VM comprises a second amplifier stage V2 composed of the pump laser diode LD3, the attenuation element, and the fiber EDF2. The pump laser diode LD2 is not active.

Due to the auxiliary module FM, which is inserted between the first and the second amplifier stage, the illustrated amplifier delivers a gain of, for example, 30 dB given activated pump laser diode LD2.

Without fiber module FM, the gain is only 20 dB. In the latter instance, however, the occupancy inversion $N'_{22}$ in the second amplifier stage V2 is lower compared to the 30 dB version. Since only one single-sided fiber section having a length $\Delta L_2$ intervenes here in the second amplifier stage V2, the condition $\Delta L_{1 \times L2} = \Delta L_2 \times L_1$ is no longer satisfied ($\Delta L_1 = 0$). The average occupancy inversion $\overline{N}_2$ is thereby changed but can be easily restored to its original value by reducing the pump power coupled into the second part.

Further limitations in the EDFA design must be adhered to for this configuration. The overall length of the doped fiber EDF in the first amplifier part given the L-band amplifier should amount to approximately 20% of the overall length. However, it should not be selected too long since the desired, average occupancy inversion $\overline{N}_2$, which is slight, can no longer be set without an introduced auxiliary module. In most applications, however, these limitations do not represent a serious problem.

In the embodiment shown in FIG. 5, however, a pump laser LD2 that is not required without auxiliary module is provided in the basic module VM. It would also be possible to accommodate this pump in the auxiliary module FM. One disadvantage of this embodiment, however, is that the auxiliary module then occupies more space and must be electrically connected. Furthermore, the auxiliary module FM must be embedded into the control circuits.

Figure 6:
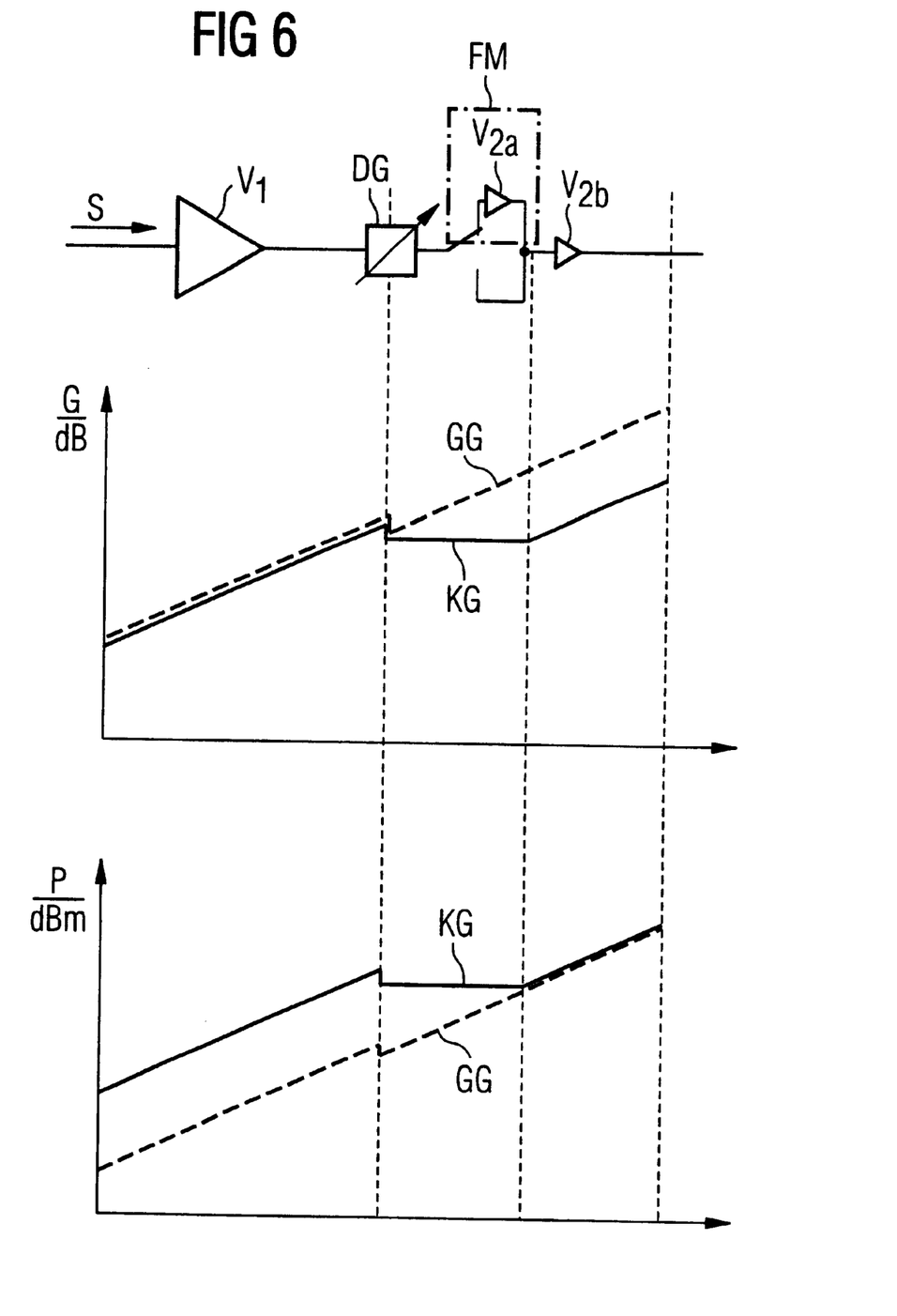
FIG. 6 is a schematic diagram illustrating the inventive new principle of setting the gain with an inserted fiber module and associated gain and power graphs.

FIG. 6 shows a version of the fiber amplifier in which the second amplifier stage V2 having a fiber length L is divided into two amplifier stages V2a and V2b each with a fiber length of L/2. The attenuation element DG is inserted between the amplifier stages V1 and V2a, so that only signals having low levels need be attenuated and no unnecessarily high pump powers are required. In this version, only one of the pump laser diodes LD2 or LD3 is potentially required. FIG. 6 explains the principle of the gain control given the use of a fiber module FM in the amplifier. The amplifier stage V2a corresponds to the fiber module FM inserted in FIG. 5. For amplifying a signal S at a low level, all amplifier stages V1, V2a and V2b are required for achieving a maximum gain.

For an input signal S with a high level, only the amplifier stages V1 and V2b (or V1 and V2a) are required. Instead of the amplifier V2a, a direct connection is provided between V1 and V2b. The attenuation element DG again serves for the fine adjustment of the output level.

Since the attenuation element only slightly attenuates the signal, the noise coefficients remain low for small and large signals. Only slight non-linearities occur in the L-band since the levels in the EDFA are kept low. Moreover, an unnecessarily high pump power is not required.

Figure 7:
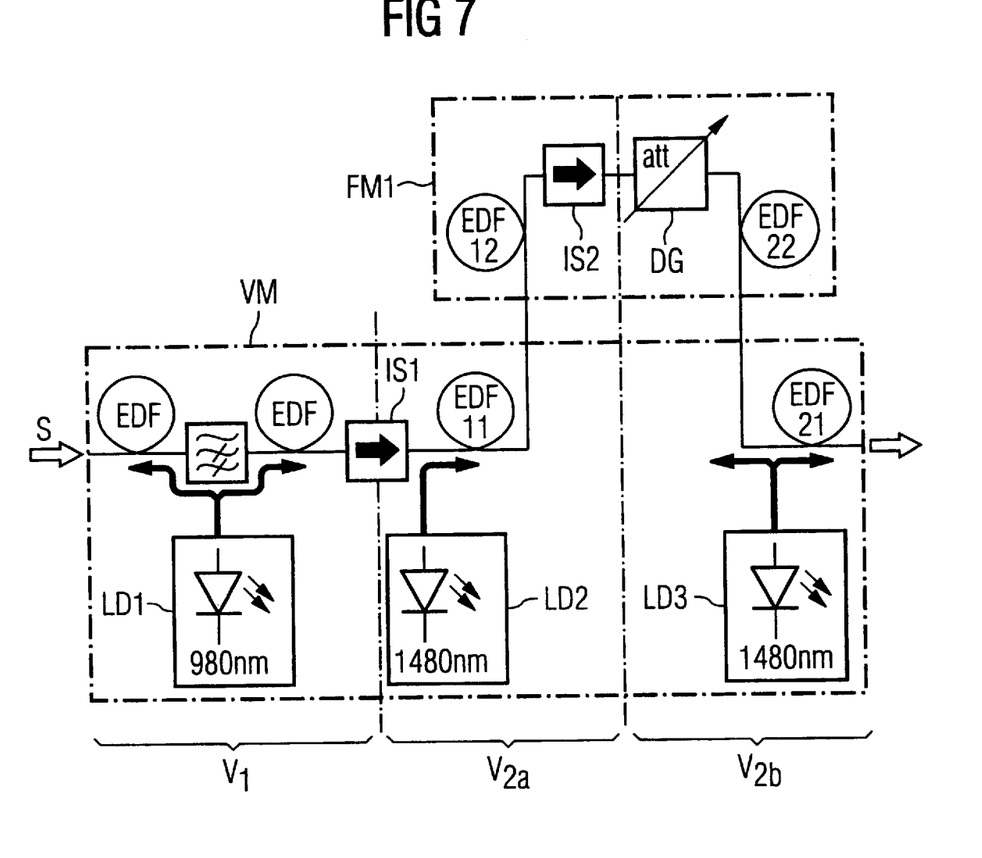
FIG. 7 is a schematic diagram illustrating a switchable and interchangeable fiber module for setting the gain of the EDFA.

A further alternative for constructing the amplifier with a fiber module FM1 is shown in FIG. 7. A first section EDF11 of the amplification fiber of the second amplifier stage V2a is arranged on the amplifier module VM; a second section EDF12 is arranged on the fiber module FM1. Likewise, a first section EDF21 of the amplification fiber of the last amplifier stage V2b is arranged on the amplifier module VM and a second section EDF22 is arranged on the fiber module FM1. The attenuation element DG and the isolator IS2 are inserted between the amplification fiber sections EDF12, EDF22 in the fiber module FM1. The sections EDF21 and EDF22 are co-directionally or, respectively, contra-directionally pumped.

Figure 8:
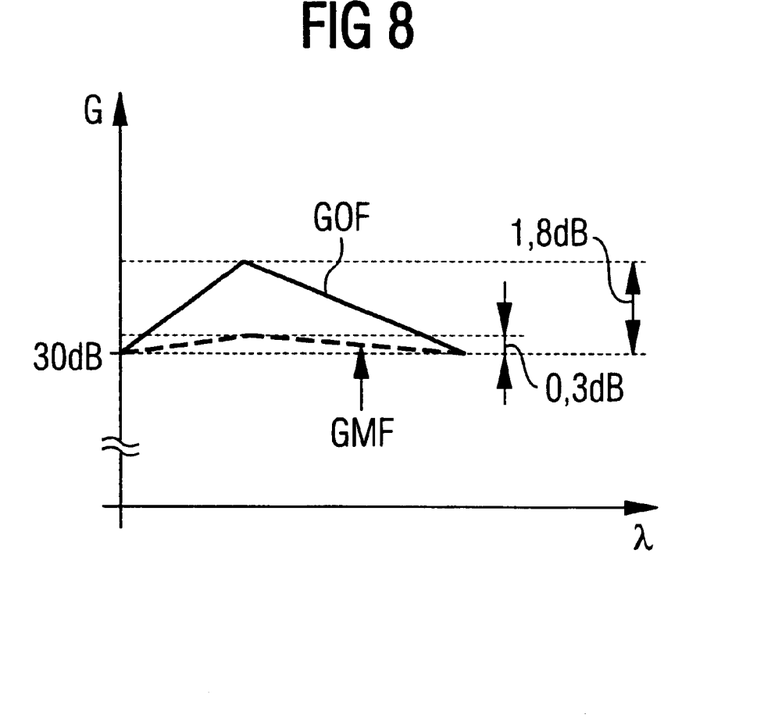
FIG. 8 is a graph illustrating the reduction of the gain differences with the assistance of a filter with a fiber module.
Figure 9:
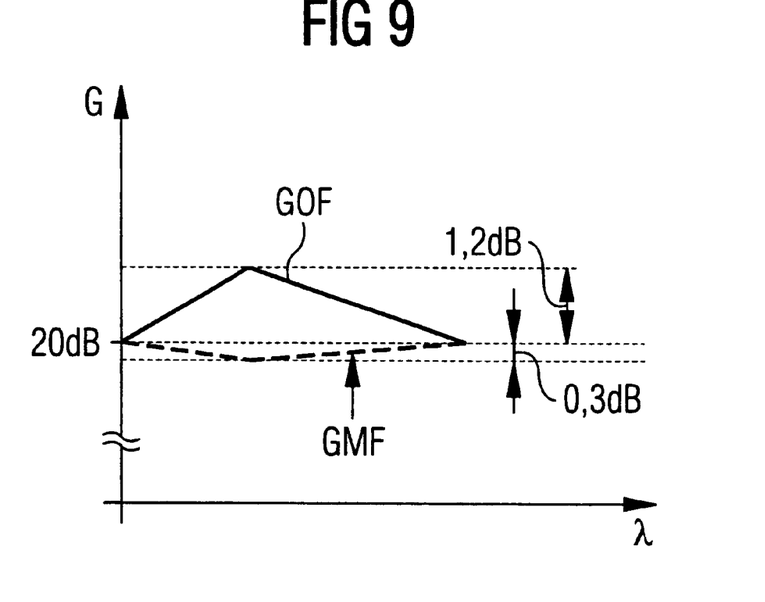
FIG. 9 is a graph illustrating the reduction of the gain difference with the assistance of a filter without a fiber module.

FIGS. 8 and 9 shows the reduction of the gain differences for the two gains of 30 dB and 20 dB with the assistance of a single filter, which is located in the amplifier module VM. An additional filter in the fiber module FM is omitted. The gain curve GOF without filter is shown with the solid line; the broken line shows the gain curve GMF with filter.

Without the filter, the gain difference between the individual wavelength channels given an amplifier gain of 30 dB typically amounts to approximately 1.8 dB in the case of an L-band amplifier. These gain differences are compensated with the assistance of a filter.

The difficulty of this is that the gain difference does not remain the same at the different amplification values of 30 and 20 dB; however, the attenuation of the filter remains constant dependent on the wavelength. A compromise must therefore be struck in the filter dimensioning. When, for example, it is provided that the gain with auxiliary module is 30 dB and the gain without the auxiliary module is 20 dB, the filter must be dimensioned such that the differences completely disappear for a gain of 25 dB. The gain difference in the two provided configurations then remains below 0.3 dB, as shown in FIGS. 8 and 9. This aspect complicates the application of the illustrated configuration to the C-band since considerably greater gain differences that must be compensated with a plurality of filters occur thereat. Given high demands for leveling the gain spectrum, smoothing filters both in the auxiliary module as well as in the basic amplifier module are usually required for a C-band amplifier. The filter in the auxiliary module can be omitted under certain circumstances given L-band amplifiers.

For dispersion compensation, the fiber module (either wholly or partially) can contain a dispersion-compensating fiber, for example the fiber EDF1, EDF12 or EDF22 (FIG. 5, FIG. 7). One or more pump sources avoid an additional attenuation. The overall gain can be kept constant with a separate gain control.

In the future, it would also be conceivable to integrate the auxiliary module into the basic amplifier module. Economical optical switches with low attenuation that experience no damage due to the high optical powers are required for this purpose.

The above-described optical fiber amplifier is illustrative of the principles of the present invention. Numerous modifications and adaptations thereof will be readily apparent to those skilled in this art without departing from the spirit and scope of the present invention.

What is claimed is:

1. An optical fiber amplifier, comprising:
   a first amplifier stage, comprising a first amplification fiber and at least a first pump source;
   a last amplifier stage, comprising a second amplification fiber and at least a second pump source;
   a fiber module that is interchangeable or switchable, comprising an additional amplification fiber, the fiber module being connected in series in the last amplifier stage and between the first amplification fiber and the second amplification fiber, the fiber module being configured to vary an effective length of the last amplifier stage for optimizing the noise behavior of the optical fiber amplifier by different gain values.

2. The optical fiber amplifier according to claim 1, further comprising:

a filter for equalizing output signal levels, the filter being in at least one of the first amplifier stage, the last amplifier stage, and the fiber module.

3. The optical fiber amplifier according to claim 1, further comprising:

a filter for equalizing output signal levels, the filter being in at least one of the first amplifier stage, the last amplifier stage, and the fiber module;

wherein the fiber module further comprises a dispersion-compensating fiber, a third pump source, and a separate gain control.

4. The optical fiber amplifier according to claim 1, further comprising:

a dispersion-compensating fiber in the fiber module.

5. The optical fiber amplifier according to claim 4, further comprising:

a third pump source in the fiber module.

6. The optical fiber amplifier according to claim 5, further comprising:

a separate gain control in the fiber module.

7. The optical fiber amplifier according to claim 1, further comprising:

an attenuation element in the fiber module or in the last amplification stage between the first amplification fiber and the additional amplification fiber or the second amplification fiber for a fine adjustment of a resulting amplifier gain or of an output power level.

8. The optical fiber amplifier according to claim 7, further comprising:

a filter for equalizing output signal levels, the filter being in at least one of the first amplifier stage, the last amplifier stage, and the fiber module.

9. The optical fiber amplifier according to claim 7, further comprising:

a filter for equalizing output signal levels, the filter being in at least one of the first amplifier stage, the last amplifier stage, and the fiber module;

wherein the fiber module further comprises a dispersion-compensating fiber, a third pump source, and a separate gain control.

10. The optical fiber amplifier according to claim 7, further comprising:

a dispersion-compensating fiber in the fiber module.

11. The optical fiber amplifier according to claim 10, further comprising:

a third pump source in the fiber module.

12. The optical fiber amplifier according to claim 11, further comprising:

a separate gain control in the fiber module.

13. The optical fiber amplifier according to claim 7, wherein a highest attenuation value of the attenuation element is less than a difference between a maximum and a minimum gain of the optical fiber amplifier.

* * * * *